(12) United States Patent
Walsh et al.

(10) Patent No.: US 7,437,307 B2
(45) Date of Patent: Oct. 14, 2008

(54) METHOD OF RELATING MULTIPLE INDEPENDENT DATABASES

(75) Inventors: Kenneth Peter Walsh, Brisbane (AU);
Harry Appel, Westbury, NY (US);
Valeri Kolokoltsev, Secaucus, NJ (US);
Corey V. Panno, Rye Brook, NY (US);
Kent M. Lancaster, Miami, FL (US);
Alexander Stepanov, New York, NY (US); Ann Zahm, New Rochelle, NY (US)

(73) Assignee: Telmar Group, Inc., Scarsdale, NY (US)

( * ) Notice: Subject to any disclaimer, the term of this patent is extended or adjusted under 35 U.S.C. 154(b) by 739 days.

(21) Appl. No.: 10/077,803

(22) Filed: Feb. 20, 2002

(65) Prior Publication Data

US 2003/0105660 A1   Jun. 5, 2003

Related U.S. Application Data

(60) Provisional application No. 60/270,369, filed on Feb. 20, 2001.

(51) Int. Cl.
*G06Q 90/00* (2006.01)
(52) U.S. Cl. .............................. 705/10; 705/7
(58) Field of Classification Search .................... 705/10
See application file for complete search history.

(56) References Cited

U.S. PATENT DOCUMENTS

| | | | | |
|---|---|---|---|---|
| 4,546,382 | A * | 10/1985 | McKenna et al. | 725/14 |
| 4,905,080 | A * | 2/1990 | Watanabe et al. | 725/14 |
| 5,845,276 | A * | 12/1998 | Emerson et al. | 707/2 |
| 6,029,176 | A | 2/2000 | Cannon | |
| 6,249,785 | B1 | 6/2001 | Paepke | |
| 6,434,747 | B1 * | 8/2002 | Khoo et al. | 725/46 |
| 6,604,239 | B1 * | 8/2003 | Kohen | 705/36 R |
| 6,983,478 | B1 * | 1/2006 | Grauch et al. | 725/13 |
| 7,043,433 | B2 * | 5/2006 | Hejna, Jr. | 704/270 |
| 7,139,723 | B2 * | 11/2006 | Conkwright et al. | 705/10 |
| 2002/0099597 | A1 * | 7/2002 | Gamage et al. | 705/10 |
| 2002/0198759 | A1 * | 12/2002 | Gilday et al. | 705/10 |

OTHER PUBLICATIONS

Hardesty, Linda: New Wave of Optimizers Wed Products to Shows, Mar. 6, 2000, Cable World, v12 N10, p. 22 [Dialog: File 9].*

* cited by examiner

*Primary Examiner*—Andre Boyce
(74) *Attorney, Agent, or Firm*—Buckley, Maschoff & Talwalker LLC

(57) ABSTRACT

A method for relating multiple independent databases uses a graphical interface allowing market researchers to conveniently model different prototype forecast scenarios based on specific choices for ad campaign portfolio distributions among specific types of advertising vehicles, media vehicles or advertising media such as television or magazine print, for example. The method solves the classic regression-to-mean problem associated with the prior art fusion approach and requires less computer processing time and/or user expertise.

9 Claims, 3 Drawing Sheets

METHOD OF RELATING MULTIPLE INDEPENDENT DATABASES

RELATED APPLICATION

This application is related to U.S. Provisional application Ser. No. 60/270,369 filed Feb. 20, 2001.

FIELD OF THE INVENTION

The present invention is a method of relating multiple independent databases wherein a plurality of source databases are maintained separately prior to a final calculation so that integrity of records they contain remains intact during preprocess estimation. The method provides for user modified data input, avoids regression-to-the-mean and is particularly advantageous for analyzing simultaneously, a plurality of large volume statistical databases such as those containing regularly issued Nielsen TV ratings, MRI ratings or many others.

BACKGROUND OF THE INVENTION

The present invention provides an improved and simplified tool for the media planning industry. A good general description of this industry is provided by Mark E. Cannon in U.S. Pat. No. 6,029,176 incorporated herein by reference. Prior art fusion methods result in a loss of precision in audience estimates from the 'donor' database producing 'regression to the mean'. In contrast, media research 'currencies' of the present invention are preserved exactly, while correlation between media vehicles from different databases are preserved, as well. Paepke U.S. Pat. No. 6,249,785 discloses a method of predicting consumer ratings wherein tables are used to translate pairs of ratings into rankings that are then used to predict ratings of future rankings. The present method differs in an important way from prior art "fusion" methods wherein a single database is created by simply combining or "fusing" two or more source databases, however.

The improved method of the present invention enables market researchers and media planners to more quickly make sense of results from a plurality of large surveys. It provides access to ratings for TV, radio and other media vehicles for target audiences wherein the target audiences may be defined not only in terms of their demographics but also in terms of their product and brand usage, lifestyle or many other marketing variables. Other variables may include those variables included by print readership surveys such as the Print Measurement Bureau's PMB studies, for example. To investigate how best to apportion limited advertising funds between competing types of media, the invention compares ratings, CPMs, and reach/frequency (R&F) performance for the same target audiences without having to fall back on simplistic demographics-the lowest common denominator across different audience surveys. Unlike so-called "single source" surveys the inventive method of the present invention (which may be called "MultiBasing") provides ratings based on the true "currency" data for each medium. This innovation means that a plurality of media surveys can now allow users to concentrate on accurate audience measurement without compromising results or overburdening respondents with vast numbers of questions on product useage and so on. The process may be employed with any combination of respondent databases. Only one survey is needed to collect all the product usage. Duplicate survey questions are no longer required.

Such a survey has a special role in MultiBasing as the -"linkage study" that provides data on statistical relationships among audiences who view a variety of different media.

For any target audience the linkage survey is used to determine statistical relationships between print and TV, for example. By including simple and cost effective measures of vehicle-level exposure, in just a few pages of a linkage survey questionnaire, enough information is obtained on print, TV, radio and other media vehicle exposure to ensure that relationships are captured just as accurately as by a hypothetical "ideal" single-source surveys.

The invention solves the well-known problem of regression-to-the-mean and avoids loss of sensitivity inherent and unavoidable using prior art fusion methods. The invention uses statistical relationships in conjunction with "currency" ratings to give major advertisers the opportunity to collect linkage data on their own market segmentation or usage and attitudes surveys to develop in-house multibasing methods optimized to patterns of consumer behavior in their specific product categories. The method provides advertisers with media ratings for target audiences defined in terms of their own marketing measures.

BRIEF SUMMARY OF THE INVENTION

MultiBasing is a method of relating multiple independent databases that accommodates both Nielsen demographic data for television vehicles, and MRI demographic data and product data for print vehicles. Using a combination of demographic linkage variables common to both data sources and surrogate MRI television links to the Nielsen television data, the method estimates MRI product usage calibrated to Nielsen television audiences. Finally, integrating and reporting functions may be performed locally on a desktop PC or directly via modem link for users accessing a web based implementation of application programs.

One object of the invention is to provide a linkage system that may quickly be modified by users without special expertise. A further object is to apply audience levels from one database (e.g. TV ratings) to target audiences defined by variables contained only in another database (e.g. buyers of product X). Another object is to estimate duplications between the audiences of different media vehicles (e.g. TV programs and magazine titles) for optimizing subsequently performed multi-media reach/frequency calculation.

Another object is to enable users to easily modify and optimize 'factory-set' linkages between databases 'on the fly' to simulate and investigate requirements for specific media planning strategies.

A still further object is to enable users to create 'prototype' media vehicles on the fly—e.g. to represent advertising influence of new or proposed magazine or TV program campaigns.

BRIEF DESCRIPTION OF THE DRAWINGS

Other objects and advantages of the invention will become apparent upon reference to the drawings, in which.

DETAILED DESCRIPTION

Figure 1:
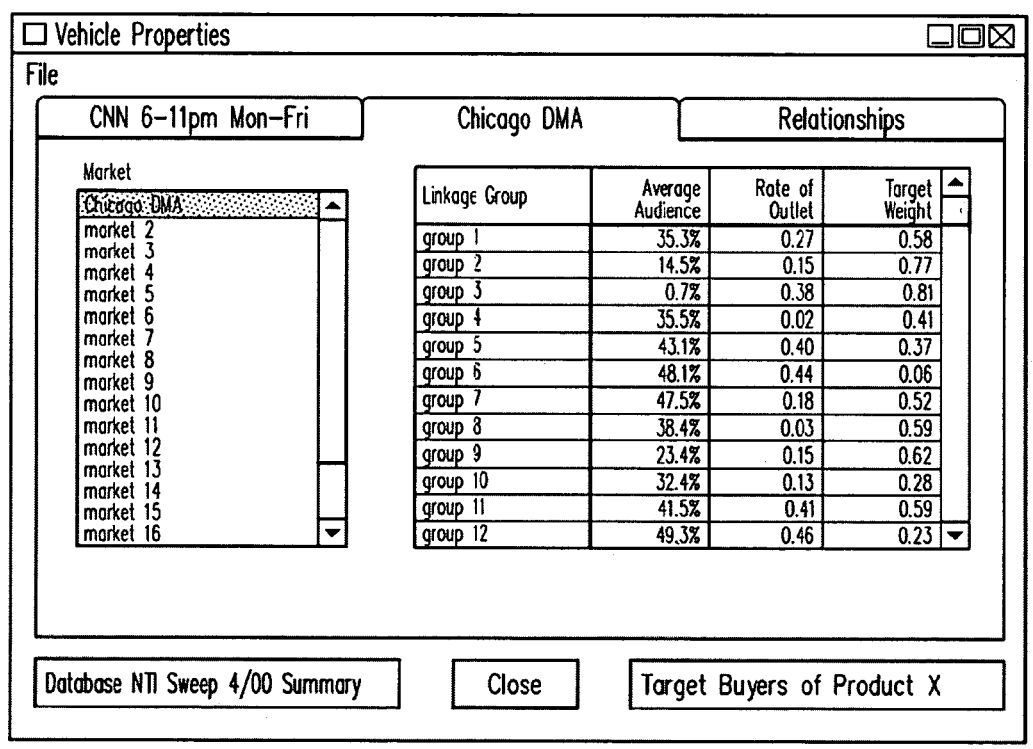
FIG. 1 is a screen presented to the user by the graphical user interface showing a list of user selectable markets, including associated linkage groups and vehicle properties including Rate of Cume and Target Weight.

To assist our following detailed discussion we first present a small alphabetical glossary of terms describing the multi-basing process.

Audience Level This is a reference to the size of the viewership or rating of a particular media vehicle. (For example, the number of women 18-34 who viewed in Prime Time).

Cross-Tabbing Synonymous with Tabbing

Currency The data survey considered by the buyers and sellers of media as being the most accurate for the measurement of a given media type (e.g. Nielsen for TV, MRI for Magazines.

Currency rating A media vehicle rating (the percent of the target population group viewing a tv program or reading a magazine) that is measured in the currency survey.

Daypart A particular time period, e.g., Sunday 7:00 to 7:30 pm, or Mon-Fri 7:00 to 7:30 pm.

Factory set correlations Refers to any actual mathematical correlation values that are associated with the factory set of linkages.

Factory set Linkages In any given set of data surveys used for MultiBasing, the particular linkage demographics to be used are chosen by statistical analysis of a broad segment of target groups. This list of demographics would be known as the factory set. This is to set it apart from any custom list of demographics which may be employed to more specifically fit a more narrowly defined population segment.

Linkage Cell A particular demographic linkage variable that is mutually exclusive. (For example, women 18-34 with income over $50,000).

Linkage data Data variables such as demographics that are common to both the linkage survey and the currency survey.

Linkage survey The survey that collects data for numerous target population groups, including demographic information used to link this survey with the currency survey, and some media data.

Linkage variables Synonymous with linkage data, a particular demographic type such as age, sex, or income.

Media research currencies Any data survey or data extracted from a survey considered by buyers and sellers of media to be the most accurate for measuring the specific medium.

Print Vehicle A Magazine or Newspaper

Schedule A group of media vehicles taken together as a collective unit. (For example, the advertisers schedule of tv spots for a given advertising campaign).

Surrogate link Surrogates represent the best media linkage available from the linkage survey that best represent the media vehicle from the currency survey. These surrogates usually form part of a factory set of vehicles; but could also be user defined.

Tabbing The process of simply tabulating an audience rating or counting the number of people who have answered one or more questions in a survey. The tabbing process is used to produce the values displayed in the sample tables below. In most surveys, the audience for a particular media vehicle is simply the sum of the respondents who answered "yes" to having viewed or read a particular tv program, daypart, magazine, newspaper, etc.

Target Audience More accurately described as the target population group (e.g., women who buy shampoo, new car purchasers, women 18-34, etc).

Total survey population universe Refers to the projected population of all respondents measured in a survey. I.e. Nielsens 5,000 respondent sample projects to 200 million people in the U.S. population.

Figure 2:
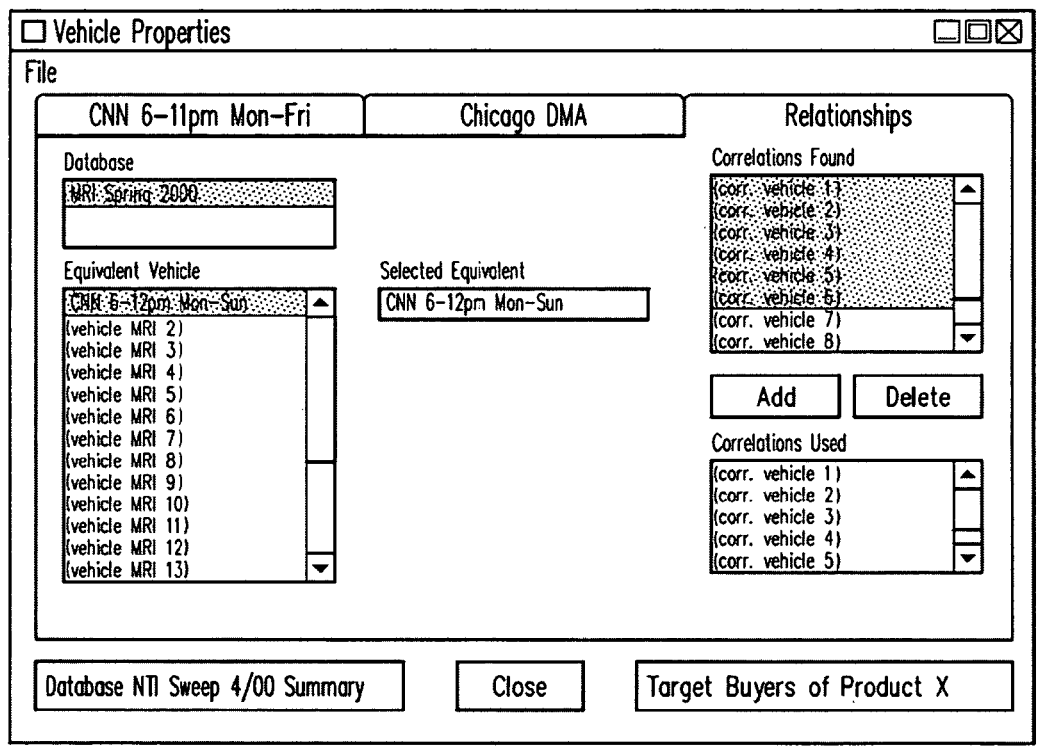
FIG. 2 is a screen presented to the user by the graphical user interface showing a list of user selectable equivalent vehicle options.

Vehicle A media entity such as a tv program, a tv daypart (Prime Time—Monday to Sunday 8-11 pm), a tv time period such as a quarter hour, a magazine, a newspaper The invention involves performing a series of steps we will now discuss more fully. The data structure is based on the concept of stored media 'properties'. To illustrate this, refer to FIG. 1 and FIG. 2 illustrating example 'property pages'.

Standard Linkage Groups

Suppose we are working with two databases, MRI respondent-level readership data for Print media, and Nielsen Media Research summary TV data. To bring these two separate surveys together so that they are directly comparable and inter-relatable, the first step is creation of a standard 'factory-set' linkage system. Typically this is done about once a year (i.e. not necessarily for every new data release) by in-house Data Departments.

Step 1

Temporary access to Nielsen respondent-level data is required for multi-variate analysis to define groups within which the variance in viewing patterns is minimized across all dayparts/channels (i.e. TV vehicles). Such groups are defined, for example, by region, sex, age, education, work status, light/medium/heavy viewing or possibly other variables, in combination with each other to the extent permitted by sample size.

Step-2

The linkage groups are then replicated in MRI and a group membership code is stored for each respondent. This completes formation of the 'factory-set' general purpose linkage system that users subsequently adjust and optimize to model projected scenarios.

Step 3

The audience data is next stored together with other vehicle 'properties' that the user can inspect, as illustrated in FIG. 1 where the selected Nielsen vehicle is CNN 6-11 pm Mon-Fri. This is what users get when a new data release is shipped.

Target Audience

When a user selects a particular target audience (e.g. buyers of product X in MRI) a cross-tabbing function is immediately performed against the standard linkage groups to determine the fraction that each linkage group's viewing contributes to the target audience's viewing overall. This is shown in FIG. 1 as a column 3 of decimal fraction data entries under the heading Target Weight.

Vehicle Correlations

The possibility exists that a target audience's actual viewing differs from the levels estimated as above, at least for some TV vehicles, due to correlations between their buying of product X and their viewing television advertisements. Not all such correlations can possibly be accounted for by the standard linkage grouping. An example of this exception would be buying of gardening products and viewing of gardening programs on TV, since neither of these behaviors is fully accounted for by demographic characteristics. However, the MRI database contains answers to TV questions that we can use to determine whether statistical relationships exist between TV viewing and buying product X.

Step 4

As mentioned under Target Audience above, the target audience variable is cross-tabbed against the linkage groups, and then within each group it is further cross-tabbed against relevant TV viewing questions collected by MRI. However, TV dayparts/channels/programs in MRI may not always correspond exactly with those in Nielsen, but factory-set 'equivalences' are put into the system and as we will illustrated shortly, users can modify these equivalences according to their particular modeling needs.

Step 5

Nielsen viewing levels are then adjusted manually by the user. The user may adjust data between buyers and non-buyers to reflect any correlations that exist for this group in the MRI data, as illustrated in Table 1. below:

TABLE 1

| Linkage group: blue collar/medium | males/1 total viewing 8-39/1 by linkage viewers group | Viewing by | |
|---|---|---|---|
| | | buyers | non-buyers |
| MRI | | | |
| TV vehicle 1 | 12.5% | 13.3% | 11.7% |
| TV vehicle 2 | 9.4% | 9.6% | 9.2% |
| etc. | | | |
| NIELSEN | original | adjusted | |
| TV vehicle 1 | 9.8% | 10.4% | 9.2% |
| TV vehicle 2 | 7.4% | 7.6% | 7.2% |
| etc. | | | |

$$V_b = \frac{V \cdot E_b}{E}.$$  Equation 1

Where $V_b$ is percentage viewing by the target audience, V is overall viewing in the linkage group, and $E_b$ and E refer similarly to the equivalent vehicle.

Duplication

Reach/frequency calculations require data on the duplication between each pair of candidate vehicles. Similar to the problem of correlations existing between TV vehicles and the target audience itself, there is also the likelihood of correlations between TV and Print vehicles that are not fully accounted for by the linkage grouping—in other words, correlations that exist between vehicles within any linkage group. Consider the example of a first vehicle, such as magazine coverage of a golf championship and a second vehicle, such as TV coverage of the same golf championship. Within a particular linkage group, such as upper income males 35 to 49 who are light TV viewers, it is highly probable that there would be non-random duplication between these two vehicles. However, this would not be evident within the individual linkage group. This problem is handled in the system by identifying statistical relationships that need to be preserved. The process is more completely explained in Step 6 below:

Step 6

For every Nielsen TV vehicle an 'equivalent' vehicle is identified by the user in the MRI rating database. Where possible the equivalent choice will of course be the same vehicle, but alternatively it can be a sufficiently similar vehicle. For example, as shown in FIG. 2 the "equivalent" to CNN 6-11 pm Mon-Fri in Nielsen has been factory-set as CNN 6-12 pm Mon-Sun in MRI (Factory settings can be changed by the user, however).

Correlations found in MRI between CNN and other vehicles will be preserved in the duplications by the process discussed below. Where there is no vehicle correlation, duplication will be random because the linkage grouping takes care of the 'macro' relationships between media vehicles—e.g. the tendency of heavy TV viewers to be light readers of certain kinds of magazines such as business titles. So, in this case, random duplication can be assumed. On the other hand, the presence of correlation indicates that duplication is not random. Duplication is required not only between every pair of candidate vehicles but also within every vehicle—i.e. a vehicle's duplication with itself, or rate of cume. It was seen earlier (in Step 3) that a rate of cume is stored (i.e. factory-set) for every vehicle on every linkage group.

Duplication is calculated using the following formula:

$$d = \frac{(C - A)}{A \cdot (1 - A)}$$

Where d is the duplication factor, A is the average audience percentage and C is the reach of 2.

Example: A=10.4%, C=16.6%, d=0.665 (i.e. less than random).

If d<1 then duplication (i.e. overlap) is greater than random; total overlap occurs at d=0. But if d>1 then duplication/overlap is less than random. This never occurs within the same vehicle but does occur between different vehicles that tend to be mutually exclusive (e.g. simultaneous TV programs).

Let $A_1$ be the smaller of the average audiences of two vehicles and let $A_2$ be the larger. Let C be the combined reach. The duplication factor in this case is given by the formula:

$$d = \frac{(C - A_2)}{A_1 \cdot (1 - A_2)}$$

Example: $A_1$=10%, $A_2$=17%, C=26%, d=1.084

Between-vehicle duplication factors need to be stored only where correlations exist. In all other cases d=1. The duplication factor enables the cumulative reach to be determined for any pair of vehicles after adjustment of viewing levels, because being a scale-invariant ratio (i.e. ratio to random duplication) d will be unaffected by the adjustment. The new cumulative reach after adjustment becomes:

$$C = d \cdot A_1 \cdot (1 - A_2) + A_2$$

The factory-set lists of correlations between MRI vehicles are stored in the system as d values and are used in reach/frequency calculations involving the Nielsen TV vehicles (i.e.

taken from their equivalents). With average audiences for the specific target, and correlation-sensitive duplications, reach/frequency calculations and optimization can now be performed.

Respondent-Level Multi-Basing

If two databases both consist of respondent-level data then the linkage grouping may be dynamic, permitting the user to optimize it in a more fundamental way. For example, if the user decides that usage of TV will be limited to a narrow advertising purchase, such as a contract limited to a particular network or cable channel provider with which a special deal has been struck. Ideally then, the linkage grouping should be set up so that it accounts for as much as possible of the variance in viewing of that particular channel, or of a limited set of time-slots or as we say "day-parts" or even programs on that channel. It is very possible that a new linkage grouping would out-perform the factory-set general purpose grouping.

While certain variables are preferably mandatory, such as region and sex, users of the present method are able to select alternatives to the factory-settings easily from a convenient list of common variables, and run a linkage optimization analysis to see whether the factory-set grouping can be improved upon.

Prototyping

Figure 3:
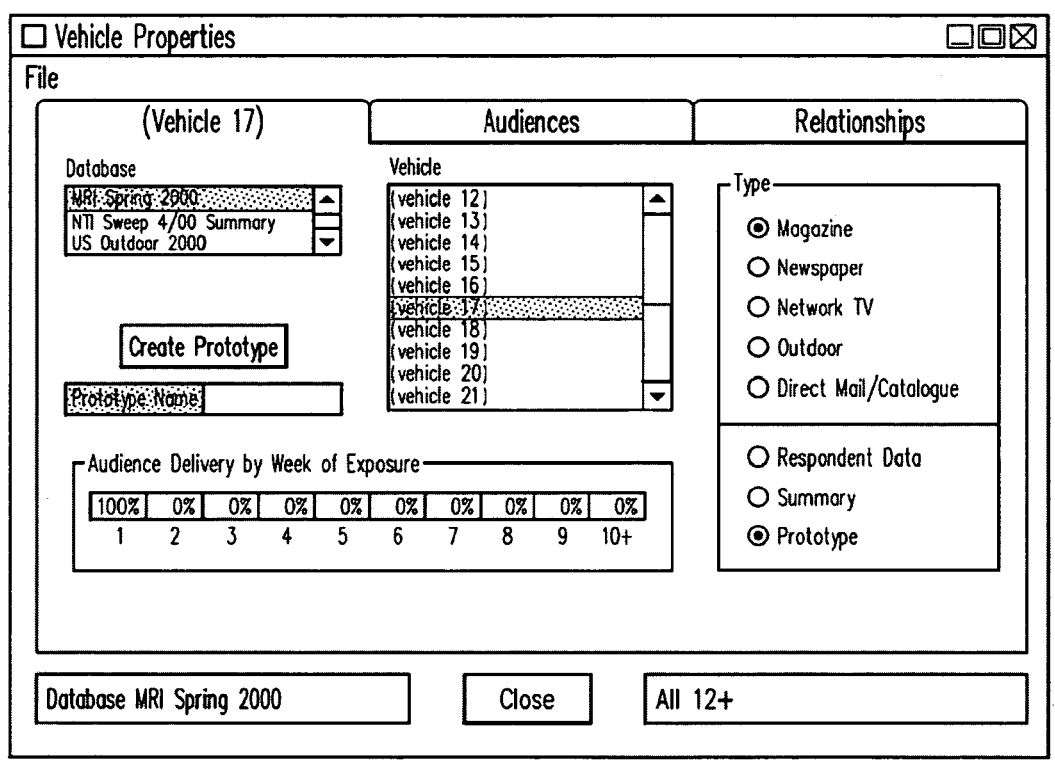
FIG. 3 is a screen for prototyping different types of proposed or imaginary media vehicles using a graphical user interface.

The way in which audience data and other 'properties' are stored in the system permits users to readily create 'prototype' media vehicles. The example of FIG. 3 shows a preferred screen layout wherein Vehicle 17 (a magazine, say) in MRI is being cloned to quickly create a prototype. Audience data and linkage relationships are then adjusted by users or researchers to reflect expected differences and the resulting prototype is included in subsequent reach/frequency calculations-and saved for future reference. Vehicles from any loaded databases (e.g. either MRI or Nielsen) can be cloned in this way. Prototyping also is used when a Nielsen TV vehicle has no equivalent vehicle in the MRI database. In this situation it is necessary for an artificial equivalent to be created by the researcher for simulation.

Other Databases

Radio, Outdoor, Direct Mail and other media-types can be represented in the system by the same vehicle property pages. To include Billboards, for example, it is necessary to have traffic data by region for each of a series of demographic groups, which is directly analogous to the property pages.

Other Properties

Not shown in the foregoing property pages, but required for complete modeling, are advertising rates and maximum levels of use (e.g. maximum number of billboards available for purchase).

Multibasing Steps

Databases: MRI and Summary Version of Nielsen Cume Study (NCS)

Factory Setup

1. Tree analysis of NCS data to identify linkage variables and create a file in the format of Table 2 below, with one such table for every linkage group identified. The values are fractions of the weighted population (i.e. probabilities, multiplying by 100 to give %).

TABLE 2

LINKAGE GROUP 1
e.g. males, 18 to 29, heavy sports viewers, cable homes

| NVS Vehicles | Average Audiences | Duplications tv-1 | tv-2 | tv-3 | ...tv-z |
|---|---|---|---|---|---|
| tv-1 | 0.123456 | 0.171265 | 0.174298 | 0.151432 | ... |
| tv-2 | 0.071071 | | 0.104927 | 0.097552 | ... |
| tv-3 | 0.038216 | | | 0.056034 | ... |
| ...tv-z | ... | | | | ... |

{One such table per linkage group.}

{One such table per linkage group.}

Cell-index numbers: This table can be saved as an array of $(v^2+3v)/2$ cells, where v is the number of vehicles. The average audience (i.e. C1) of vehicle i is found in cell $s_i=(i-1)\cdot(2v-i+4)/2+1$. The C2 of vehicle i is found in cell $s_i+1$. The duplication (i.e. combined reach) of any two vehicles i and j, where i<=j, is found in cell s+1+j−i.

If the tables for all linkage groups are saved in the same file then an offset of $(g-1)\cdot(v^2+3v)/2$, where g is the number of linkage groups, must be added to each formula.

2. Code MRI to set up the same linkage groups.
3. Harmonize MRI linkage groups with NCS: They must have nearly identical % distributions. Some may be significantly different at first due to different source questions (e.g. 'heavy sports viewers' will come from different measures in the two surveys).
4. Media vehicle categories and equivalents: The system needs to know what TV vehicle in MRI is to be used as the equivalent (for correlation purposes) of each TV vehicle in NCS, and what category each vehicle is to be classified under in the vehicle lists.

Multibasing

1. The user selects a target audience and general candidate media categories and next Tabs MRI immediately to produce the following 4 sets of tables. (If no general media categories are selected, all MRI vehicles including equivalents are tabbed).

Target Composition Table
TARGET AUDIENCE - e.g. beer drinkers TCT

| Linkage group: | Size of Group | In Target Audience | Not in Target Audience | Target Composition |
|---|---|---|---|---|
| group-1 | 0.#### | 0.#### | 0.#### | 0.#### |
| group-2 | 0.#### | 0.#### | 0.#### | 0.#### |
| group-3 | 0.#### | 0.#### | 0.#### | 0.#### |
| group-z | ... | ... | ... | ... |

{One such table per target audience}

Target Leverage Table
LINKAGE GROUP 1 TLT

| NCS Equivalents in MRI | Average Audiences | In Target Audience | Not in Target Audience | Leverage Factor |
|---|---|---|---|---|
| tv'-1 | 0.#### | 0.#### | 0.#### | 0.#### |
| tv'-2 | 0.#### | 0.#### | 0.#### | 0.#### |
| tv'-3 | 0.#### | 0.#### | 0.#### | 0.#### |
| ... tv'-z | ... | ... | ... | ... |

{One such table per linkage group per target audience}

Print Vehicles Table
LINKAGE GROUP 1 PVT

| MRI Vehicles | Average Audiences | Duplications (i.e. Combined Reach) | | | |
|---|---|---|---|---|---|
| | | print-1 | print-2 | print-3 | ... print-z |
| print-1 | 0.#### | 0.#### | 0.#### | 0.#### | ... |
| print-2 | 0.#### | | 0.#### | 0.#### | ... |
| print-3 | 0.#### | | | 0.#### | ... |
| ... print-z | ... | | | | ... |

{One such table per linkage group per target audience.}

Link Table 1
LINKAGE GROUP 1 LT1

| NCS Equivalents in MRI | Average Audiences | Duplications (i.e. Combined Reach) | | | |
|---|---|---|---|---|---|
| | | print-1 | print-2 | print-3 | ... print-z |
| tv-1 | 0.#### | 0.#### | 0.#### | 0.#### | ... |
| tv-2 | 0.#### | | 0.#### | 0.#### | ... |
| tv-3 | 0.#### | | | 0.#### | ... |
| ... tv'-z | ... | | | | ... |

{One such table per linkage group per target audience.}

2. Bring in the following NCS table for each linkage group.

TV Table 1
LINKAGE GROUP 1 LT1

| NCS Equivalents in MRI | Average Audiences | Duplications (i.e. Combined Reach) | | | |
|---|---|---|---|---|---|
| | | print-1 | print-2 | print-3 | ... print-z |
| tv-1 | 0.#### | 0.#### | 0.#### | 0.#### | ... |
| tv-2 | 0.#### | | 0.#### | 0.#### | ... |
| tv-3 | 0.#### | | | 0.#### | ... |
| ... tv'-z | ... | | | | ... |

{One such table per linkage group per target audience.}

3. it is possible that within any linkage group there may be correlations between the target audience (e.g. beer drinkers) and particular TV vehicles (e.g. Saturday afternoon sports programmes) that is not automatically accounted for in the linkage system. Use the TLT in conjunction with TV1 to produce TV2 for each linkage group. The formula is given in Section C.

TV Table 2
LINKAGE GROUP 1 (replaces TV1)

| Leveraged NCS Vehicles | Average Audiences | Duplications (i.e. Combined Reach) | | | |
|---|---|---|---|---|---|
| | | tvl-1 | tvl-2 | tvl-3 | ... print-z |
| tv-1 | 0.#### | 0.#### | 0.#### | 0.#### | ... |
| tv-2 | 0.#### | | 0.#### | 0.#### | ... |
| tv-3 | 0.#### | | | 0.#### | ... |
| ... tvl-z | ... | | | | ... |

{One such table per linkage group per target audience.}

4. Create a new table of duplications similar to LT1 but replacing MRI equivalents with the actual NCS vehicles (now leveraged) that they are equivalent to. This is because the average audiences for the MRI equivalents are not the same as for the actual NCS vehicles, and so the duplications between them and the MRI vehicles (i.e. Print) are therefore incorrect. The formulae are given in Section C.

Link Table 2
LINKAGE GROUP 1 (replaces LT1)

| Leveraged NCS Vehicles | Average Audiences | Duplications (i.e. Combined Reach) | | | |
|---|---|---|---|---|---|
| | | print-1 | print-2 | print-3 | ... print-z |
| tvl-1 | 0.#### | 0.#### | 0.#### | 0.#### | ... |
| tvl-2 | 0.#### | | 0.#### | 0.#### | ... |
| tvl-3 | 0.#### | | | 0.#### | ... |
| ... tvl-z | ... | | | | ... |

{One such table per linkage group per target audience}

5. Calculate a weighted sum of linkage groups for each set of tables using the Target Composition weights from the TCT to produce three final input tables for the R&F engine. These three final tables are equivalent to one all-vehicles table of C1, C2, and duplication values.
   PVT—TV2—LT2

Formulae

1. Applying Target Audience Leverage to NCS Vehicle Audiences (see step 3):
   $a(j)$=overall average audience of NCS vehicle j as a proportion of the linkage group
   $a(j')$=overall average audience of the MRI equivalent to NCS vehicle j
   $x(j')$=proportion of the linkage group in both the target audience and $A(J')$
   $x(j)$=proportion of the linkage group in both the target audience and $A(j)$
   ='leveraged' average audience of NCS vehicle j
   $=a(j)/a(j') \, x(j')$

EXAMPLE

Target Leverage Table
LINKAGE GROUP 1 TLT

| NCS Equivalents in MRI | Average Audiences | In Target Audience | Not in Target Audience | Leverage Factor |
|---|---|---|---|---|
| Total Group | 1.0000 | 0.3214 | 0.6786 | |
| tv'-1 | 0.1234 | 0.0509 | 0.0725 | 1.2834 |

1.2834 = 0.0509/0.3214/0.1234

TV Table 1
LINKAGE GROUP 1 TV1

| NCS Vehicles | Average Audiences | Duplications (i.e. Combined Reach) | | | |
|---|---|---|---|---|---|
| | | tv-1 | tv-1 | tv-1 | ... tv-z |
| tv-1 | 0.0756 | 0.#### | 0.#### | 0.#### | ... |

TV Table 2
LINKAGE GROUP 1 TV2 (replaces TV1)

| Leveraged NCS Vehicles | Average Audiences | Duplications (i.e. Combined Reach) | | | |
|---|---|---|---|---|---|
| | | tvl-1 | tvl-1 | tvl-1 | ... tvl-z |
| tv-1 | 0.0970 | 0.#### | 0.#### | 0.#### | ... |

0.0312 = 1.2834 × 0.0756

Store this new audience value in LT2 (see following example).

2. Adjustment of Duplications:

A(i)=true average audience of MRI vehicle i (i.e. print-i in the tables above)

A(j)=true average audience of leveraged NCS vehicle j (i.e. tvl-j

A(j')=average audience of the MRI equivalent to NCS vehicle j (i.e. tv'-j)

D'(i, j')=duplication (i.e. combined reach) of MRI vehicle i and MRI equivalent to NCS vehicle j p1 D(i,j)=true duplication of MRI vehicle i and NCS vehicle j $$D(i,j) = f \cdot P \cdot (1-P) + P$$

where...

$$P = 1 - ((1-A(i)) \cdot (1-A(j)))^{0.5}$$

$$f = (D'(i,j') - P')/(P' \cdot (1-P'))$$

$$P' = 1 - ((1-A(i)) \cdot (1-A(j')))^{0.5}$$

EXAMPLE

Print Vehicles Table
LINKAGE GROUP 1 PVT

| MRI Vehicles | Average Audiences | Duplications (i.e. Combined Reach) | | | |
|---|---|---|---|---|---|
| | | print-1 | print-2 | print-3 | ... print-z |
| print-1 | 0.1034 | 0.#### | 0.#### | 0.#### | ... |

Link Table 1
LINKAGE GROUP 1 LT1

| NCS Equivalents in MRI | Average Audiences | Duplications (i.e. Combined Reach) | | | |
|---|---|---|---|---|---|
| | | print-1 | print-2 | print-3 | ... print-z |
| tv'-1 | 0.0509 | 0.1516 | 0.#### | 0.#### | ... |

Link Table 2
LINKAGE GROUP 1 LT2 (replaces LT1)

| Leveraged NCS Vehicles | Average Audiences | Duplications | | | |
|---|---|---|---|---|---|
| | | print-1 | print-2 | print-3 | ... print-z |
| tvl-1 | 0.0970 | 0.1936 | 0.#### | 0.#### | ... |

$$P' = 1 - ((1-0.1034) \times (1-0.0509))^{0.5} = 0.0775$$

$$f = (0.1516 - 0.0775)/(0.0775 \times (1-0.0775)) = 1.0358$$

$$P = 1 - ((1-0.1034) \times (1-0.0970))^{0.5} = 0.1002$$

$$D(i,j) = 1.0358 \times 0.1002 \times (1-0.1002) + 0.1002 = 0.1936$$

The same adjustment procedure is applied to table TV2. MultiBasing is a fusion concept requiring two or more separate databases containing survey respondent results. It can not be used with a single fused database. It uses multiple respondent databases simultaneously in real time; MRI for Magazines and Nielsen Persons Cume for Network and Cable TV vehicles. Produced for agencies who have access to both MRI for magazines and the Nielsen Persons Cume Study for TV, the MultiBasing technique of fusion brings together multiple databases without physically merging or ascribing data directly upon any survey. It is this unique approach which not only sets it apart from other fusion methodologies, but which allows the method to be quickly deployed for any respondent survey combinations. MultiBasing uses Nielsen Ratings and Duplications for TV; It uses, MRI Audiences and Duplications for Magazines, and it uses the Relative Duplications between media from MRI. In one case involving 2 surveys, the ratings currency and the media duplications of each respective database, were totally maintained; Nielsen for television, and MRI for magazines. In addition, the relative cross-media duplications from MRI, the multi-media database in this case, were used.

The method may be used to define any target group and is not limited to just Demos Respondent/Cell Level Accuracy. It uses the Currency for Each Medium, Preserves Real Life Correlations and Produces media actionable results.

MultiBasing offers the advertiser or agency the ability to analyze and produce optimal media plans against any MRI measured target group, whereas using just Nielsen confines the user to simple analysis based upon basic demographics only. All of the real-life correlations inherent in any multi-media and marketing database may be maintained, at the same time preserving the currency of any individual medium.

Here is a simple example of how the process works.

First, we define some terminology. In order to bring together multiple database, we need to establish a list of data variables that are common to each database. In this case, demographic characteristics are the only common elements. Several hundred such mutually exclusive demographics were selected.

We call these the "Linkage Cells".

When added together, the sum of all linkage cells should add up to the total survey population universe. Since we are using the Nielsen Persons Cume Study for TV, composed of various program schedules defined by Network, Daypart, and Program Type, we need to find similar media element definitions in MRI to closely approximate those in Nielsen. We call these similar vehicles media "Surrogates"

When selecting the "Linkage Cells" for database combination, we use as many cells as possible that contain enough respondents to be statistically reliable and conform to such standards as set up by the data suppliers. In addition, one may employ some form of discriminate or AID tree type of analysis to select those cells that are as different as possible in their TV viewing patterns over a broad range of target variables.

Linkage Cells
Define Linkage Cells as different as possible in their viewing
Tabulate Ratings for Nielsen and MRI Surrogates
Example below is for one TV vehicle

| | | Vehicle = Prime Network Mon-Sun 7-11 pm | Demo Linkage cell 1 | Demo linkage cell 2 | Demo linkage cell 3 | Demo linkage cell 4 | Demo linkage cell 5 |
|---|---|---|---|---|---|---|---|
| | | | Nielsen Demo | | | | |
| Rating | vehicle viewing levels | | 6.16% | 4.28% | 5.23% | 7.03% | 2.49% |
| | | | MRI Demo | | | | |
| Rating | surrogate viewing Levels | | 10.54% | 6.96% | 8.18% | 11.68% | 3.83% |

Represented in the above table is one network TV program daypart vehicle and one target group. To simplify the math, we are displaying only 5 of the hundreds of demographic cells actually used.

The First Step is to tabulate ratings representing vehicle viewing levels of the Nielsen programs for each demographic linkage cell, while the second step is to tabulate the Surrogate viewing levels from MRI in the same fashion.

Target Market
Tabulate MRI Target
Overseas Vacationers In past year

| Overseas Vacationers in past year | Demo linkage cell 1 | Demo linkage cell 2 | Demo linkage cell 3 | Demo linkage cell 4 | Demo linkage cell 5 | Total |
|---|---|---|---|---|---|---|
| MRI Target present in target (000) | 3,560 | 5,932 | 7,059 | 10,833 | 4,280 | 31,664 |

Independent from the media vehicle, we next tabulate the specific target group populations in each demographic linkage cell. The example target group used here are Overseas Vacationers.

Project Audience for Target
Based on relative presence of each Linkage Cell in Target, project overall
vehicle audience for that target.

| Vehicle Viewing Level | Demo linkage cell 1 | Demo linkage cell 2 | Demo linkage cell 3 | Demo linkage cell 4 | Demo linkage cell 5 | |
|---|---|---|---|---|---|---|
| | Nielsen Demo Rtg | | | | | |
| vehicle viewing Levels | 6.16% | 4.28% | 5.23% | 7.03% | 2.49% | |
| MRI Target present in target (000) | 3,560 | 5,932 | 7,059 | 10,833 | 4,280 | 31,664 |
| =Est. Nielsen Aud projected audience (000) | 219 | 254 | 369 | 762 | 107 | =1,711 |

Based on relative presence of each Linkage Cell in the overseas vacationer target group, we make a projection of the vehicle audience by multiplying the Nielsen vehicle rating by the target population in each cell. The individual demographic audiences are then added together to represent the total vehicle audience based upon the demographic profile of the target market.

Project Audience for Surrogates =
Based on relative presence of each Linkage Cell in Target,
project Surrogate vehicle audience for that target

| Surrogate Viewing Level | Demo linkage cell 1 | Demo linkage cell 2 | Demo linkage cell 3 | Demo linkage cell 4 | Demo linkage cell 5 | |
|---|---|---|---|---|---|---|
| | MRI Demo Rtg | | | | | |
| surrogate viewing levels | 10.54% | 6.96% | 8.18% | 11.68% | 3.83% | |
| MRI Target present in target (000) | 3,560 | 5,932 | 7,059 | 10,833 | 4,280 | 31,664 |
| | Est. MRI Aud | | | | | |
| projected audience (000) = | 375 | 413 | 577 | 1,265 | 164 | 2,795 |

The same audience projection is then made for the Surrogate vehicle based upon the MRI demographic profile of the target market.

Audiences based on Profile
So far, we have determined the vehicle's audience based on the demographic

| | | |
|---|---|---|
| Projected Vehicle Target Audience | 1,711 | 5.4% |
| Projected Surrogate Target Audience profile of the Target Market | 2,795 | 8.8% |

This point would be reached by any form of Fusion

We have now determined the vehicle audiences from each database based upon the demographic profile of the target market. Such audience levels would be achieved by any form of media data Fusion.

| Tab Surrogates against Target Unique to MultiBasing Tab Surrogate against the Target market to get its actual audience | | |
|---|---|---|
| Tab against Target | Audience | Rating |
| Actual Surrogate Audience (000) | 3,258 | 10.3% |

The next steps are unique to the multibasing process and they allow users to confidently analyze any target market measured by any multi-media/marketing data survey. Since we have both a measurement of our target overseas vacationers, and television media measured in MRI, we can directly tabulate the actual MRI Surrogate audience for our TV vehicle.

| Compare Actual to Demo projected Audience Actual Audience is higher than demographically projected Audience Indicates Target market has greater than average tendency to watch this particular TV vehicle | | |
|---|---|---|
| Projected Vehicle Audience (based on demo profile) | 1,711 | 5.4% |
| Projected Surrogate Audience (based on demo profile) | 2,795 | 8.8% |
| Actual Surrogate Target Audience (000) | 3,258 | 10.3% |

We now have the Nielsen projected audience based upon the target's demographic profile, the MRI Surrogate audience based upon the target's demographic profile, and the actual target market audience projection based upon the MRI TV Surrogates. In comparing the results, it is noted that the actual target audience based upon the MRI Surrogate is higher than the audience projected from the MRI Surrogate based upon its demographic profile. This indicates that our overseas vacationer target market has a greater than average tendency to watch this particular TV vehicle.

| All Values Compared | | | |
|---|---|---|---|
| | Population | Audience | Rating |
| Adult Population | 199,438 | | |
| Nielsen Adult Audience | | 10,446 | 5.2% |
| MRI Adult Audience | | 17,046 | 8.5% |
| Target Population | 31,664 | | |
| Nielsen Demo Profile Projection | | 1,711 | 5.4% |
| MRI Demo Profile | | 2,795 | 8.8% |
| MRI Tabbed Target Audience | | 3,258 | 10.3% |
| MultiBased Target Audience | | 1,994 | 6.3% |

Note that in comparing all of the values thus far generated, the Nielsen and MRI Adult audience ratings are based on Total Adults, while the Target ratings are based on the Target population.

Adjust Projected Audience
Adjust the projected vehicle audience accordingly $$\frac{\text{Actual vehicle Audience}}{} = \frac{\text{Projected vehicle audience}}{\text{Projected surrogate audience}} \times \text{Actual Surrogate Audience}$$

$$= (1{,}711/2{,}795) \times 3{,}258$$

$$= 1{,}994 \,(6.3\% \text{ of Target Market})$$

Similar procedures are applied to calculate turnover and cross vehicle duplications.

There is one last step remaining to complete the process. Thus far, we have estimated the MRI based audience for the vehicle. Now, we must adjust it so it reflects the audience that would be estimated to be the Nielsen actual target audience, if in fact, Nielsen had actually measured it. To do this, we use the initial relationship of the demographically skewed Nielsen and MRI Surrogate audiences, and multiply them by the actual Surrogate estimated target audience as shown in the example table above.

This describes the process for estimating a target average audience for any TV vehicle represented by Nielsen. A similar, but more complicated process is then employed to deal with the turnover and cross vehicle duplication for each vehicle combination. Since TV audiences by daypart also have a ceiling in terms of the number of people that can be reached, such daypart "caps" are also factored in.

| Example Rating Results | | |
|---|---|---|
| Example Prime Time Vehicle | Adults 18+ | Foreign Vacation |
| MRI Surrogate | 8.5% | 10.3% |
| Nielsen | 5.2% | NA |
| MultiBased Result | 5.2% | 6.3% |

Note that the MultiBased results for any demographic will always match the Nielsen result, while the MultiBased result for any MRI target will reflect an estimate of what Nielsen would report if, in fact, they had actually measured such a target.

| | Real Results | | |
|---|---|---|---|
| Daytime TV 3 Networks | Adults 18+ | W25-54 | Foreign Vacation |
| MRI Surrogates | 1.6 | 2.1 | 1.3 |
| Nielsen | 1.4 | 1.5 | NA |
| MultiBased Results | 1.4 | 1.5 | 1.1 |

The above example shows actual or real results wherein Daytime network TV, total adults ratings and the popular women 25-54 demographic rating is compared with the rating provided by our overseas vacationer audience. Thus, the MultiBasing results reflect an accurate depiction for any measured demographic, and an estimated target audience in line with what one would logically expect.

What is claimed is:

1. A method for correlating media vehicles from different databases, the method comprising:
   creating a linkage system between a first media vehicle database associated with a first media vehicle and a second media vehicle database associated with a second media vehicle different than the first media vehicle, the linkage system associating the first and the second databases together based on comparable and inter-relatable demographic variables common to each of the databases and the first and the second databases relating to different media entities, the first media vehicle database and the second media vehicle database being independent of each other;

tabulating first market rating data associated with the first media vehicle database for at least one of the demographic variables, the first market rating data including media vehicle viewing levels and audience demographic data;

tabulating surrogate market rating data associated with the second media vehicle database for the at least one demographic variables, the second market rating data including media vehicle viewing levels and audience demographic data;

determining target group populations for the at least one demographic variables for the second media vehicle database;

calculating a projected vehicle audience for the first media vehicle database based on the first market rating data associated with the first media vehicle database and the determined target group populations;

calculating a projected surrogate audience for the second media vehicle database based on the surrogate market rating data associated with the second media vehicle database and the determined target group populations;

determining an actual surrogate audience; and providing an output of an actual vehicle audience for the first media vehicle represented by the first media database based on the projected vehicle audience for the first media vehicle database, the projected surrogate audience for the second media vehicle database, and the actual surrogate audience.

2. The method of claim 1, wherein the first database includes Nielsen Ratings.

3. The method of claim 1, wherein the second database includes MRI Ratings.

4. The method of claim 1, wherein the actual vehicle audience is calculated according to the following equation:

$$\text{Actual Vehicle Audience} = \frac{\text{Projected Vehicle Audience}}{\text{Projected Surrogate Audience}} \times \text{Actual Surrogate Audience.}$$

5. The method of claim 1, further comprising:

comparing the projected vehicle audience for the first media vehicle database, the projected surrogate audience for the second media vehicle database, and the actual surrogate audience; and determining a viewing tendency related to the target group populations based on the comparison.

6. The method of claim 1, wherein the linkage system using default settings to determine the demographic variables.

7. The method of claim 6, wherein the demographic variables of the linkage system are periodically updated.

8. The method of claim 1, wherein the demographic variables of the linkage system are selectively determined by a user.

9. The method of claim 1, wherein the first media vehicle and second vehicle are selected from the group of: television media, radio media, and print media.

* * * * *